US007893371B2

(12) United States Patent
Kawakami et al.

(10) Patent No.: US 7,893,371 B2
(45) Date of Patent: Feb. 22, 2011

(54) PRESSURE SWITCH

(75) Inventors: Hiroshi Kawakami, Chigasaki (JP); Kazuhiro Kurahara, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 524 days.

(21) Appl. No.: 11/951,844

(22) Filed: Dec. 6, 2007

(65) Prior Publication Data

US 2008/0135395 A1 Jun. 12, 2008

(30) Foreign Application Priority Data

Dec. 7, 2006 (JP) .............................. 2006-331108

(51) Int. Cl.
*H01H 35/26* (2006.01)
*H01H 35/24* (2006.01)

(52) U.S. Cl. ................................... 200/81 R

(58) Field of Classification Search ............... 200/81 R; 340/626

See application file for complete search history.

(56) References Cited

U.S. PATENT DOCUMENTS

| 4,343,974 | A | * | 8/1982 | Hire et al. | .................... 200/243 |
| RE34,893 | E | | 4/1995 | Fujii et al. | |
| 5,587,535 | A | | 12/1996 | Sasaki et al. | |
| 6,003,379 | A | | 12/1999 | Ichikawa et al. | |
| 6,447,342 | B1 | | 9/2002 | Lawlyes et al. | |
| 6,604,430 | B2 | | 8/2003 | Saito et al. | |
| 6,869,109 | B2 | | 3/2005 | Matsushita | |
| 6,997,059 | B2 | | 2/2006 | Ernsberger et al. | |
| 7,104,136 | B2 | * | 9/2006 | Akiyama et al. | ............... 73/715 |
| 7,186,934 | B2 | | 3/2007 | Nakajima | |
| 7,240,558 | B2 | | 7/2007 | Ernsberger et al. | |
| 7,270,010 | B2 | | 9/2007 | Kaneko et al. | |
| 7,663,496 | B2 | * | 2/2010 | Kawakami et al. | ........... 340/626 |
| 2002/0178829 | A1 | | 12/2002 | Saito et al. | |

FOREIGN PATENT DOCUMENTS

| DE | 3918769 | 12/1989 |
| DE | 19807200 | 8/1999 |
| DE | 10216020 | 10/2002 |
| DE | 10343729 | 5/2004 |
| DE | 102005057774 | 10/2006 |
| EP | 0976961 | 9/2002 |
| JP | 51-101973 | 8/1976 |
| JP | 62-115694 | 7/1987 |
| JP | 07-37473 | 2/1995 |
| JP | 11-030535 | 2/1999 |
| JP | 2001-033336 | 2/2001 |
| JP | 2002-310836 | 10/2002 |
| JP | 2005-345412 | 12/2005 |
| WO | 2006/076745 | 7/2006 |

* cited by examiner

*Primary Examiner*—Renee Luebke
*Assistant Examiner*—Lheiren Mae A Caroc
(74) *Attorney, Agent, or Firm*—Paul A. Guss

(57) ABSTRACT

In a pressure switch, a joint coupling holder is installed in a case of a housing through an opening, and a joint coupling, to which piping is connected, is connected to the joint coupling holder. The joint coupling holder includes a protective wall therein, which is arranged on a straight line with a detector that is accommodated inside the housing at a central portion of a through hole. In addition, a pressure fluid, which is introduced to the detector through a conduit of the joint coupling, flows in a bypassing manner through a pair of communication openings while averting the protective wall.

7 Claims, 6 Drawing Sheets

PRESSURE SWITCH

BACKGROUND OF THE INVENTION

1. Field of the Invention

The present invention relates to a pressure switch, which outputs a detection signal when the pressure value of a pressure fluid, as detected by a detector, matches and agrees with a preset pressure value.

2. Description of the Related Art

Heretofore, transporting a workpiece to a predetermined position has been carried out by supplying a negative pressure fluid to a suction transport means made up, for example, from a suction pad, and while the workpiece is attracted under suction to the suction pad. In this case, in order to confirm whether or not the pressure value of the negative pressure fluid supplied to the suction pad reaches and attains a predetermined pressure, whereby it can be confirmed whether or not the workpiece has been reliably attracted under suction, a pressure switch is employed. Generally speaking, such a pressure switch is equipped with a semiconductor pressure sensor functioning as a detector, whereby the pressure of the fluid is detected based on a resistance value that changes in accordance with the pressure imposed on the pressure sensor. In addition, in the case that the pressure value detected by the pressure sensor agrees with a preset pressure value that is set beforehand, it is judged that the workpiece has been attracted under suction and a detection signal is output.

As disclosed in Japanese Laid-Open Patent Publication No. 7-37473, in this type of pressure switch, a vacuum piping is detachably connected through a pipe coupling to a pressure intake of a main body in which the detector is accommodated. The negative pressure fluid that flows through the vacuum piping is introduced into the main body, whereby the pressure of the negative pressure fluid is detected.

However, with the aforementioned pressure switch, oil droplets that are ejected from the compressor making up the source of negative pressure, or water droplets generated due to condensation as well as foreign matter contained within the fluid, move along the vacuum piping and collide against the pressure sensor, which is accommodated inside the main body. In this case, because the pressure sensor is constructed such that the pressure of a fluid that flows through a very small opening arranged within the flow passage is detected, the oil droplets, water droplets and foreign matter flow through the small opening and impinge directly on the pressure sensor. Thus, defects are produced in the pressure sensor, raising concerns that the detection accuracy will become deteriorated.

SUMMARY OF THE INVENTION

A general object of the present invention is to provide a pressure switch, which prevents the ingress of foreign matter such as grit and dust or the like toward the detector, thus enabling the pressure of a pressure fluid to be reliably and stably detected by means of the detector.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
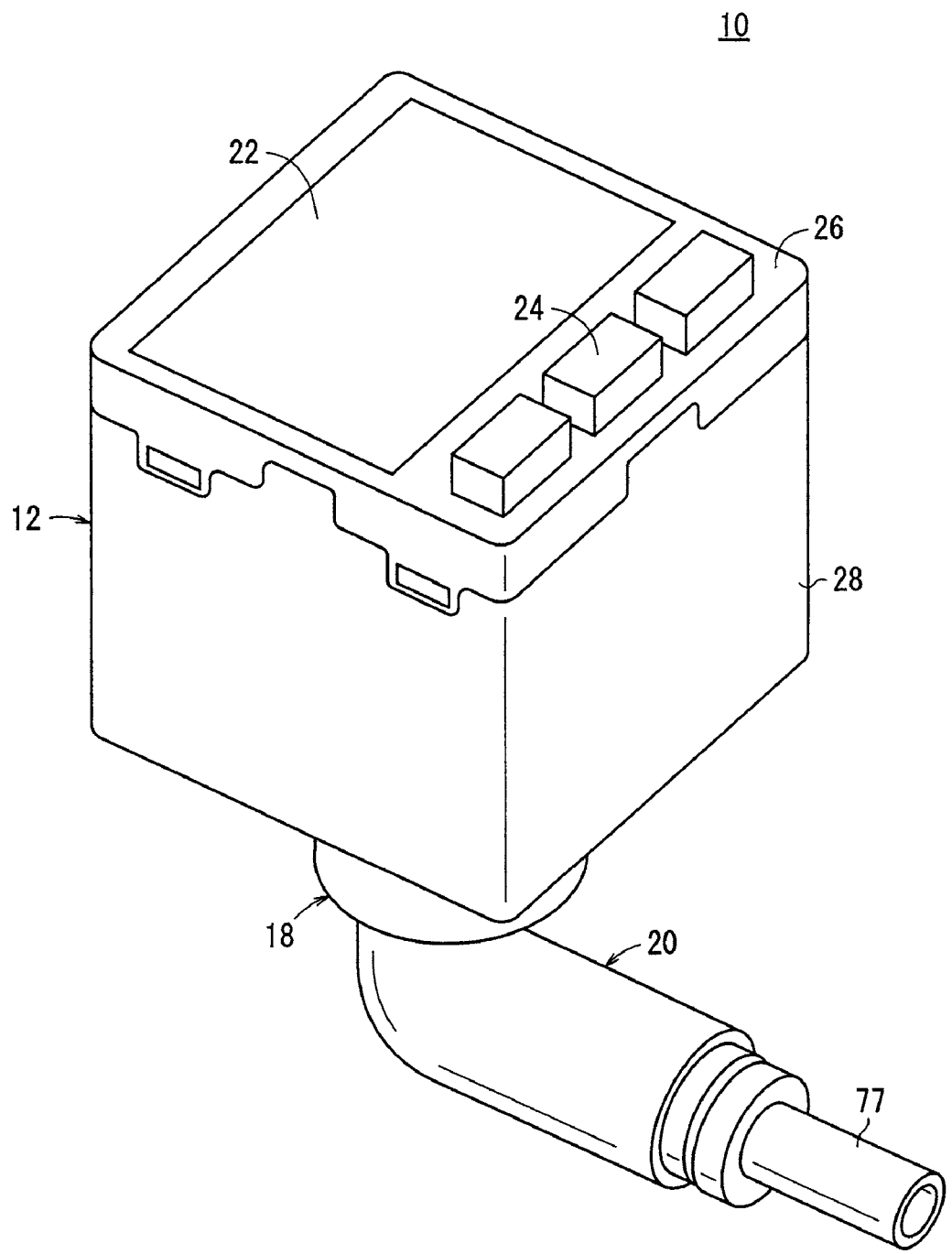
FIG. 1 is an exterior perspective view of a pressure switch according to an embodiment of the present invention.
Figure 2:
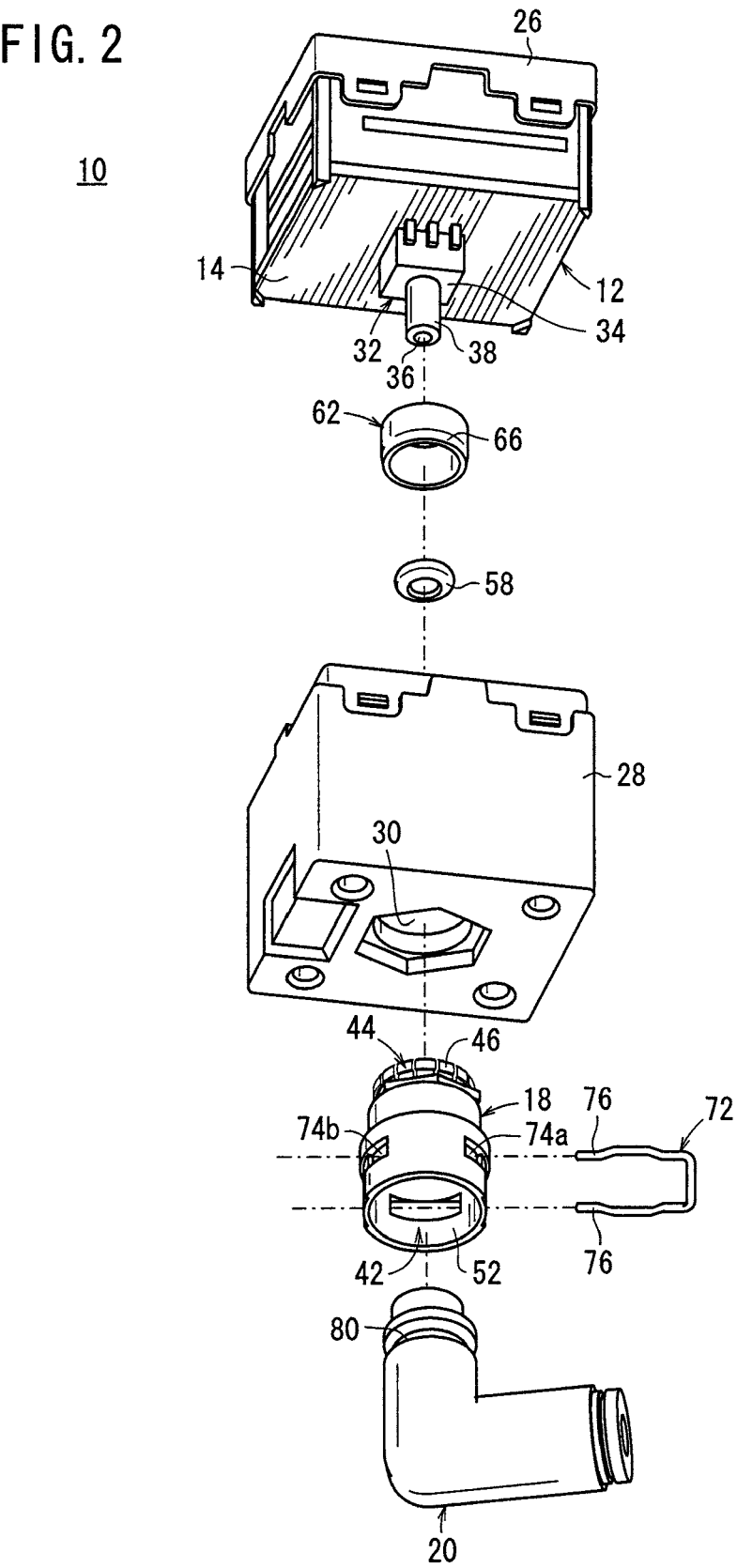
FIG. 2 is an exploded perspective view of the pressure switch shown in FIG. 1.
Figure 3:
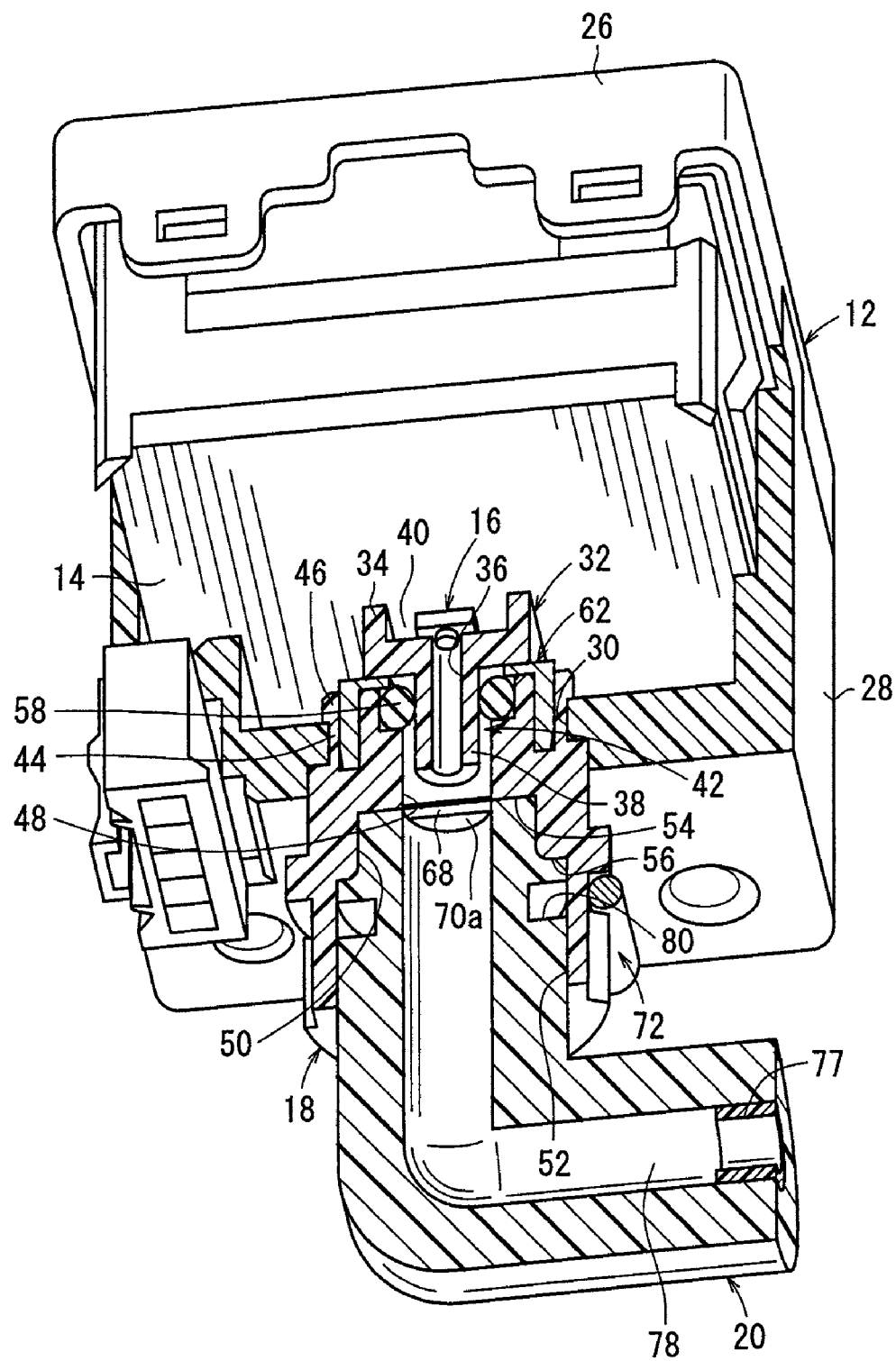
FIG. 3 is a perspective view, partially in cross section, of the pressure switch of FIG. 1, as viewed from a different direction.
Figure 4:
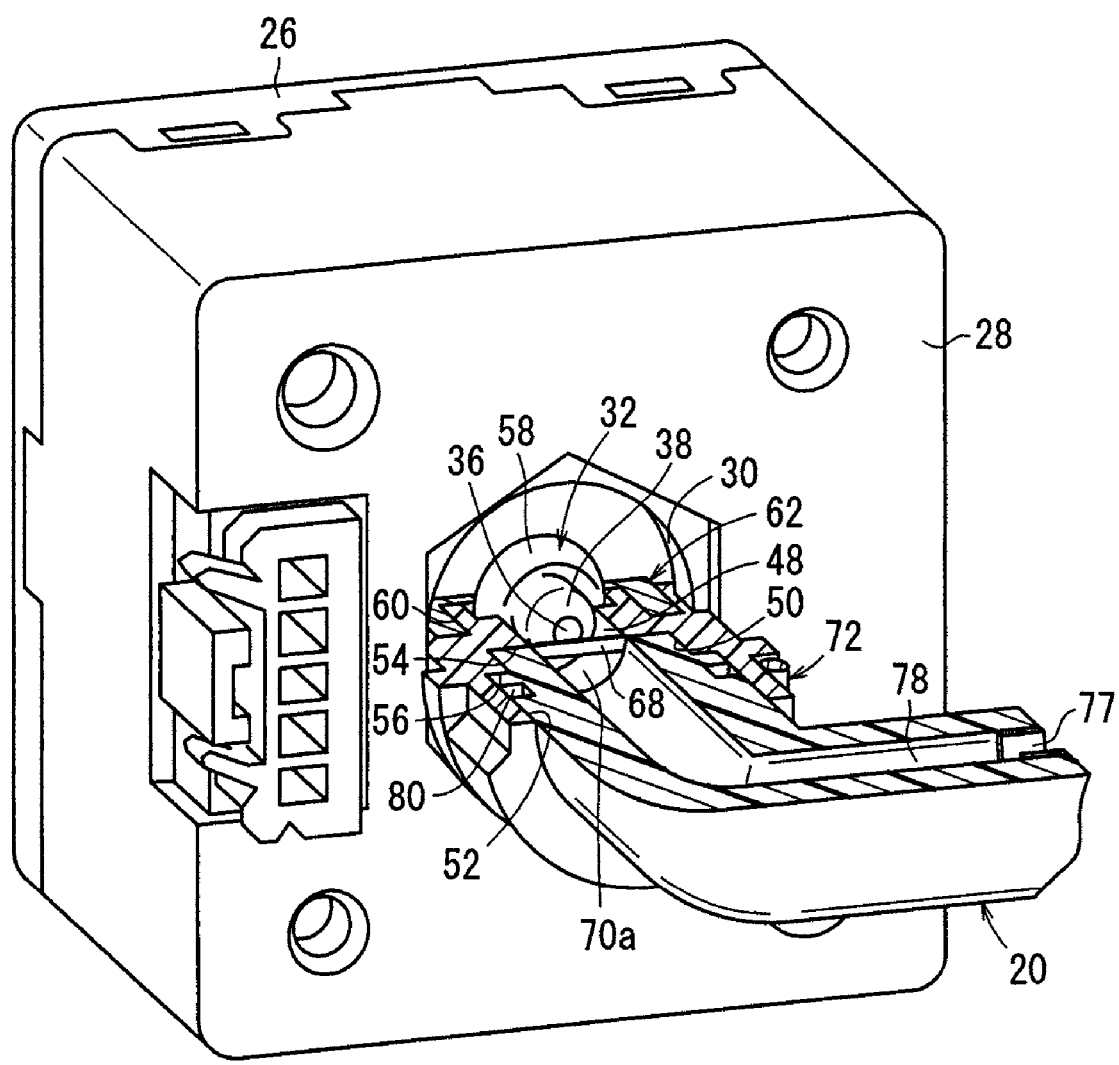
FIG. 4 is a perspective view, partially in cross section, of the pressure switch of FIG. 3, as viewed from yet another direction.
Figure 5:
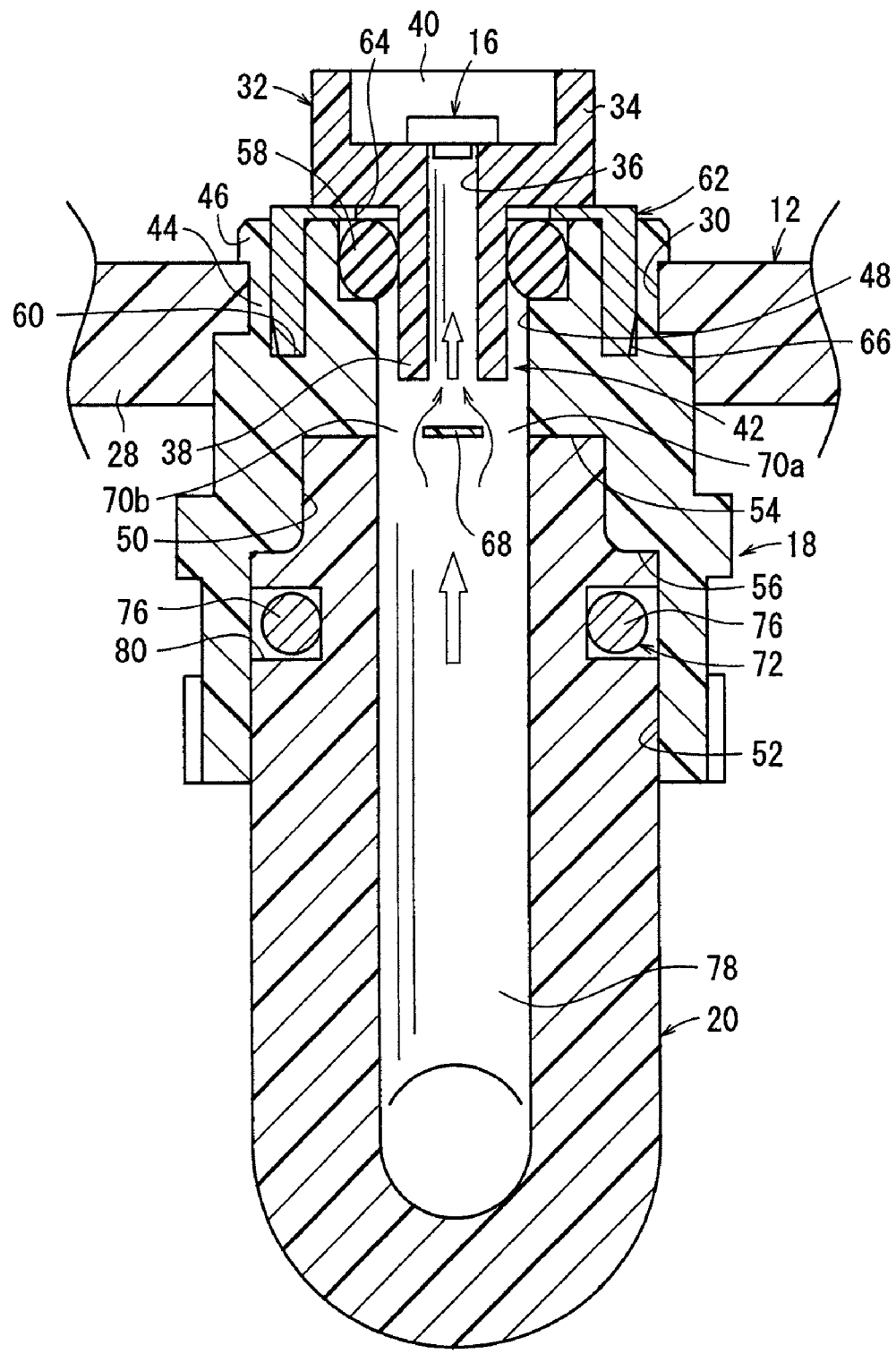
FIG. 5 is an enlarged cross sectional view showing the vicinity of a joint coupling holder, in the pressure switch illustrated in FIG. 2.

In FIG. 1, reference numeral 10 indicates a pressure switch in accordance with an embodiment of the present invention.

The pressure switch 10, as shown in FIGS. 1 through 5, includes a housing 12, a control substrate 14 disposed inside the housing 12, a detector 16, which detects the pressure of a pressure fluid (e.g., a negative pressure fluid), disposed on the control substrate 14, a joint coupling holder (adapter) 18 mounted in an opening 30 of the housing 12, and a joint coupling 20, which is connected to the joint coupling holder 18, and through which a fluid flows.

The housing 12 is constituted by a plate shaped cover 26, on which a display 22 and operating buttons 24 are provided, and a bottomed box shaped case 28 inside of which the control substrate 14 is accommodated. An opening of the case 28 is closed by mounting the cover 26 thereon, in a state in which the control substrate 14 and the detector 16 are accommodated therein, whereby the case 28 is hermetically closed and sealed.

Further, an opening 30 is formed substantially centrally in the bottom of the case 28, and the joint coupling holder 18 is installed and mounted in the opening 30.

The control substrate 14 is fixed inside the case 28, substantially in parallel with the bottom of the case 28. The control substrate 14 is connected electrically to the display 22 and the operating buttons 24. The display 22 is capable of displaying, for example, the pressure value of the pressure fluid, which is detected by the detector 16. The operating buttons 24 are provided, for example, in order to carry out operations for setting various modes of operation.

The detector 16 is mounted on a side surface of the control substrate 14 facing the opening 30 of the case 28, and is connected electrically with respect to the control substrate 14. The detector 16, for example, is constituted from a semiconductor pressure sensor, and is capable of detecting pressure based on a resistance value, which changes by means of the pressure of the pressure fluid that is imposed on the detector 16.

A sensor holder 32 is substantially T-shaped in cross section, and is constituted by a base member 34 formed on one end thereof, which is installed so as to surround the detector 16 with respect to the control substrate 14, and a cylindrical member 38 projecting from the base member 34 and having a passage (first passage) 36 defined therein through which the pressure fluid flows.

A space 40 is provided on an inner portion of the base member 34, inside of which the detector 16 is accommodated. The space 40 communicates with the passage 36 of the cylindrical member 38. The cylindrical member 38 is disposed substantially in the center of the base member 34 and is formed along a straight line, having a given height in a direction separating away from the control substrate 14, such that the passage 36 is formed along the axis thereof. More specifically, the passage 36 is arranged so as to face towards the detector 16, which is disposed inside the space 40.

The joint coupling holder 18 is formed in a cylindrical shape having a through hole (second passage) 42 substantially in a center portion thereof along the axial direction. One end of the joint coupling holder 18 is insertable into the opening 30 of the housing 12, and a plurality of engagement pawls 44, which are compressible in a radial direction, are disposed on an outer circumferential side of the through hole 42. The engagement pawls 44 are arranged circumferentially along the joint coupling holder 18, separated by equal intervals, and include expanded portions 46 thereon, which project in a radially outward direction on ends of the engagement pawls 44. Specifically, the ends of the engagement pawls 44 having the expanded portions 46 are provided so as to be capable of tilting or being bent radially inward (see FIG. 5).

The through hole 42 includes a first hole 48 formed on one end side of the joint coupling holder 18 and into which a cylindrical member 38 of the sensor holder 32 is inserted, a second hole 50 adjacent to the first hole 48 and expanded in diameter with respect to the first hole 48, and a third hole 52 formed on another end side of the joint coupling holder 18 and which is expanded in diameter greater than the second hole 50.

Further, a first stepped portion 54 is formed at the boundary position between the first hole 48 and the second hole 50, whereas a second stepped portion 56 is formed at the boundary position between the second hole 50 and the third hole 52. The first and second stepped portions 54, 56 are formed in planar shapes substantially perpendicular to the axis of the through hole 42.

In addition, when the joint coupling 20 is inserted into the second and third holes 50, 52 that constitute the through hole 42, a portion of the joint coupling 20 engages through abutment with the first and second stepped portions 54, 56.

Furthermore, an o-ring 58 is installed via an annular groove that is formed in the through hole 42 along an inner circumferential surface of the first hole 48, such that when the cylindrical member 38 of the sensor holder 32 is inserted into the through hole 42, the o-ring abuts against an outer circumferential surface of the cylindrical member 38. Accordingly, outward leaking of the pressure fluid from between the through hole 42 in the joint coupling holder 18 and the cylindrical member 38 of the sensor holder 32 is prevented, and an airtight condition inside the joint coupling holder 18 is maintained.

An annular recess 60 is disposed between the through hole 42 and the engagement pawls 44 at one end of the joint coupling holder 18, and a cap 62, which is formed substantially U-shaped in cross section, is inserted into the recess 60. Inside the recess 60, the cap 62 abuts against an inner circumferential surface of the engagement pawls 44, thereby regulating displacement of the engagement pawls 44 in a radially inward direction.

The cap 62 is formed with a hole 64 substantially centrally therein, and the cylindrical member 38 of the sensor holder 32 is inserted through the hole 64 when the joint coupling holder 18 is installed. Specifically, the cylindrical member 38 is inserted into the through hole 42 of the joint coupling holder 18 by way of the hole 64 of the cap 62.

Further, the cap 62 is formed in a cylindrical shape, having a tapered surface 66 formed on an outer circumferential surface thereof, which gradually reduces in diameter toward the end of the cap 62. In addition, the cap 62 is inserted into the recess 60 from the tapered surface 66 portion thereof. In particular, the engagement pawls 44 of the joint coupling holder 18 are pressed in a radially outward direction gradually by the tapered surface 66 of the cap 62, thereby securing the joint coupling holder 18 such that the engagement pawls 44 is maintained in a substantially parallel condition with respect to the axis of the joint coupling holder 18, by the outer circumferential surface of the cap 62.

Stated otherwise, the cap 62 functions as a stopper means, which regulates radially inward displacement of the engagement pawls 44 making up the joint coupling holder 18.

Moreover, since the cap 62 covers a portion of the through hole 42, disengagement of the o-ring 58 that has been installed in the through hole 42 is suitably prevented.

Further, a protective wall (wall portion) 68 is disposed in the first hole 48 at the end thereof that coincides with the second hole 50. The protective wall 68 is arranged substantially perpendicular to the axis of the joint coupling holder 18, so as to extend across the center of the through hole 42. The protective wall 68 is formed in a straight line shape having a predetermined width W, and being formed so as to connect mutually with the inner circumferential surface centrally about the axis of the through hole 42.

Figure 6:
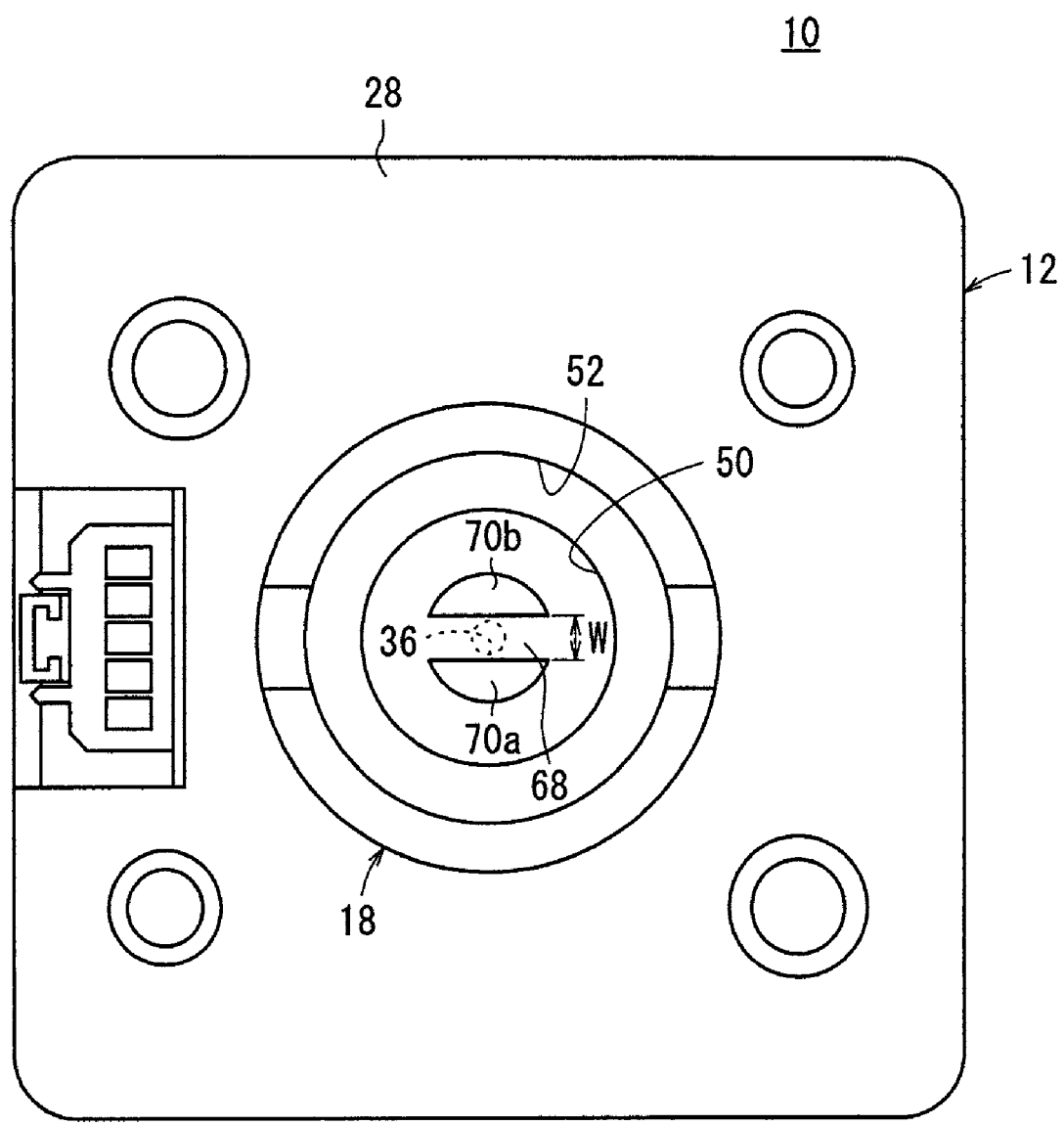
FIG. 6 is a plan view in which the pressure switch illustrated in FIG. 1 is viewed from a side of the joint coupling holder.

In addition, as shown in FIG. 6, semicircular communication openings 70a, 70b are formed in the first hole 48, respectively on both sides about the center of the protective wall 68. The width dimension of the protective wall 68 is set such that the protective wall 68 covers approximately one third (⅓) of the cross sectional area of the first hole 48. More specifically, in the first hole 48 making up the through hole 42, approximately one third (⅓) of the cross sectional area thereof is blocked by the protective wall 68, whereas each cross sectional area of the one and the other of the two communication openings 70a, 70b is roughly the same as the cross sectional area of the protective wall 68.

Furthermore, when the cylindrical member 38 of the sensor holder 32 is inserted into the through hole 42 of the joint coupling holder 18, the protective wall 68 is positioned and arranged on an extension line of the axis of the passage 36 in the cylindrical member 38. In this manner, when the pressure fluid flows from the joint coupling 20 that is installed in the through hole 42 and toward the passage 36, the protective wall 68 is disposed such that the pressure fluid does not flow along a straight line from the through hole 42 to the passage 36. Stated otherwise, owing to the protective wall 68, the pressure fluid, which is introduced into the joint coupling holder 18 from the interior of the joint coupling 20, flows in a bypassing manner through the communication openings 70a, 70b (see FIG. 5).

On the other hand, a pair of pin holes 74a, 74b are formed on the outer circumferential surface of the joint coupling holder 18, into which a connecting pin 72 is inserted for connecting the joint coupling 20 to the joint coupling holder 18. The pin holes 74a, 74b are formed along a straight line at substantially symmetric positions about the axis of the joint coupling holder 18.

The connecting pin 72 is formed substantially in a U-shape, and is inserted into one of the pin holes 74a from a side of the ends of a pair of pin members 76 that are separated by a predetermined distance, the pin members 76 passing through the interior of the joint coupling holder 18, and being inserted through the other pin hole 74b.

The joint coupling 20 is formed substantially with an L-shape in cross section, which is bent at a right angle, one end of the joint coupling 20 being connected by the connecting pin 72 to the other end of the joint coupling holder 18. Piping 77 through which a fluid flows is detachably connected to the other end of the joint coupling 20. The joint coupling 20 is not limited to being formed with a substantially L-shaped cross section. It also is acceptable for the joint coupling 20 to have a straight shape, arranged along a straight line from one end to the other end thereof.

A conduit 78 through which the pressure fluid flows via the piping 77 is formed at the interior of the joint coupling 20, such that when the joint coupling 20 is connected to the joint coupling holder 18, the conduit 78 communicates with the through hole 42 of the joint coupling holder 18, such that the conduit 78 at the other end of the joint coupling 20 and the through hole 42 are arranged on a straight line.

Further, an annular shaped pin groove 80 is formed at a position symmetrical with respect to the axis of the joint coupling 20 on the outer circumferential surface of the joint coupling 20, such that the pin members 76 of the connecting pin 72 are inserted respectively into the pin groove 80. Specifically, one end of the joint coupling 20 is inserted into the through hole 42 of the joint coupling holder 18, and when the joint coupling 20 is in a state of stopped engagement with the first and second stepped portions 54, 56, the pin members 76 of the connecting pin 72 engage respectively with the pin groove 80 of the joint coupling 20 by insertion of the connecting pin 72 from one of the pin holes 74a in the joint coupling holder 18.

As a result, the respective positioning of the joint coupling 20 and the joint coupling holder 18 along the axial direction is regulated by the connecting pin 72, and the joint coupling 20 is connected together with the joint coupling holder 18.

The pressure switch according to the embodiment of the present invention is basically constructed as described above. Next, a brief explanation shall be given concerning a method of assembling the pressure switch 10. In the following description, it shall be understood that the display 22, the operating buttons 24, and the control substrate 14, etc., are already in an assembled state on the cover 26 that makes up one element of the housing 12.

First, one end of the joint coupling holder 18 is inserted into the opening 30 of the case 28 that makes up the housing 12, whereupon the engagement pawls 44 project through the opening 30 toward the inside from the bottom of the case 28. At this time, the engagement pawls 44 are at first pressed radially inward and reduced in diameter by the inner wall surface of the opening 30, and then are slightly expanded radially outward in diameter again, due to the expanded portions 46 projecting outwardly with respect to the bottom of the case 28.

In addition, by inserting the cap 62 into the recess 60 of the joint coupling holder 18 from the side of the case 28, the engagement pawls 44 are pressed in a radial outward direction and displacement thereof in the radial inward direction is regulated. As a result, the expanded portions 46 of the engagement pawls 44 engage with the bottom of the case 28 and the joint coupling holder 18 is connected with respect to the case 28.

More specifically, since radial inward displacement of the engagement pawls 44 is regulated, in a state in which the expanded portions 46 are engaged with the bottom of the case 28, the engagement pawls 44 do not move toward the interior of the opening 30 and are firmly fixed with respect to the case 28.

Next, the o-ring 58 is installed in the through hole 42 of the joint coupling holder 18, and the control substrate 14, on which the sensor holder 32 including the detector 16 is mounted, is installed in the case 28 from above, together with attachment of the cover 26. Accordingly, the control substrate 14 and the sensor holder 32 are accommodated inside the case 28, and the open end of the case 28 is closed by the cover 26.

Further, the cylindrical member 38 of the sensor holder 32 is inserted into the first hole 48 of the joint coupling holder 18, whereupon the outer circumferential surface of the cylindrical member 38 is surrounded and enclosed by the o-ring 58. Owing thereto, an airtight condition between the sensor holder 32 and the joint coupling holder 18 is reliably maintained. At this time, the passage 36 formed in the cylindrical member 38 is arranged at a position confronting the protective wall 68 of the joint coupling holder 18. Further, the aforementioned o-ring 58 may also be installed beforehand with respect to the first hole 48 before the joint coupling holder 18 is connected to the case 28.

Lastly, one end of the joint coupling 20 is inserted into the through hole 42 of the joint coupling holder 18, whereupon the joint coupling 20 is positioned by abutment against the first and second stepped portions 54, 56. At the same time, by inserting the connecting pin 72 from one of the pin holes 74a in the joint coupling holder 18, and by continued insertion thereof through the other of the pin holes 74b, the pin members 76 are inserted through the pin groove 80 of the joint coupling 20, which has been inserted inside of the joint coupling holder 18, and accordingly, the joint coupling holder 18 and the joint coupling 20 are connected together integrally.

Next, operations and effects of the pressure switch 10, which has been assembled in the foregoing manner, shall be explained.

First, a pressure fluid is supplied to the piping 77 from an unillustrated pressure fluid supply source (for example, a compressor), whereupon the pressure fluid flows through the piping 77 and into the conduit 78 inside the joint coupling 20. In addition, the pressure fluid, which flows from the conduit 78 and into the through hole 42 of the joint coupling holder 18, is obstructed by the protective wall 68 of the first hole 48 making up the through hole 42, so that the pressure fluid flows in a bypassing manner, avoiding the protective wall 68, while being diverted through the pair of communication openings 70a, 70b disposed on both sides of the protective wall 68.

For example, in the case that moisture or dust is contained within the pressure fluid, such moisture and dust collides against the protective wall 68 while flowing from the conduit 78 toward the first hole 48. Owing thereto, such moisture and dust is prevented from moving in a straight line from the conduit 78 and into the first hole 48, whereby entry of the moisture and dust within the pressure fluid into the first hole 48 from the conduit 78 is regulated.

In addition, the pressure fluid which has flowed through the pair of communication openings 70a, 70b and into the first hole 48 is introduced into the space 40 through the passage 36 of the sensor holder 32. Accordingly, the pressure of the pressure fluid is imposed with respect to the detector 16 that is accommodated in the space 40. A resistance value, which is changed by the pressure, is output to the control substrate 14, whereby the pressure of the pressure fluid is calculated based on the change in the resistance value. The pressure value of the pressure fluid is output to the display 22 from the control substrate 14 and displayed, and together therewith, an output signal based on the pressure value may be output to an external device.

As discussed above, with the present embodiment, as a result of disposing the protective wall 68 in the center of the through hole 42 in the joint coupling holder 18, a pressure fluid that flows from the through hole 42 through the passage 36 facing the detector 16, can be diverted in a bypassing manner through the communication openings 70a, 70b. Stated otherwise, flow of the pressure fluid along a straight line directly toward the passage 36 from the conduit 78 and the through hole 42 of the joint coupling 20 can be prevented. Owing thereto, in the case that moisture, dust and debris or the like are contained within the pressure fluid, such moisture and dust is prevented from traveling along with the pressure fluid in a straight line toward the passage 36 from the conduit 78, and then through the passage 36 and colliding directly against the detector 16. As a result, even when the pressure fluid contains moisture, dust or debris therein, deterioration in the detection accuracy of the detector 16 does not occur, and the pressure of the pressure fluid can be accurately and stably detected. Accordingly, reliability of the pressure switch 10 can be improved in a variety of environments of use.

Further, the joint coupling holder 18 is installed in an opening 30 of the housing 12 in which the detector 16 is accommodated. The joint coupling 20, to which the piping 77 is connected, is detachably connected with respect to the joint coupling holder 18 by a connecting pin 72. Thus, since the joint coupling 20 can be easily detached from the housing 12 and exchanged, maintenance operations on the pressure switch 10 can be performed with improved ease.

The pressure switch according to the present invention is not limited to the above-described embodiment, and various other structures may be adopted as a matter of course, which to not deviate from the essential features and gist of the present invention.

What is claimed is:

1. A pressure switch having a detector therein for detecting a pressure of a pressure fluid, and outputting an output signal on the basis of a pressure value detected by said detector, the pressure switch comprising:
   a housing having a first passage through which said pressure fluid flows;
   a detector accommodated inside said housing, facing said first passage, for detecting the pressure of said pressure fluid;
   an adapter installed into said housing and having a second passage therein that communicates with said first passage and which is arranged coaxially with said first passage;
   a joint coupling disposed detachably with respect to said adapter, and which is connected to piping through which said pressure fluid is supplied; and
   a wall portion disposed on an axis of said first and second passages, for regulating flow of said pressure fluid that flows toward said detector,
   wherein said joint coupling is inserted into said adapter through said second passage and is connected to said adapter by engagement of a connecting pin inserted through a pin hole formed in said adapter.

2. The pressure switch according to claim 1, wherein said wall portion is disposed in one of said first passage and said second passage, and wherein communication openings through which said pressure fluid flows are formed between said wall portion and an inner circumferential surface of said first passage or said second passage.

3. The pressure switch according to claim 2, wherein said wall portion is formed in a straight shape having a predetermined width and is arranged so as to face said first and second passages.

4. The pressure switch according to claim 3, wherein said wall portion covers substantially one-third of the cross sectional area of either said first passage or said second passage.

5. The pressure switch according to claim 4, wherein the pressure fluid that flows through said first passage or said second passage flows through said communication openings while bypassing said wall portion.

6. The pressure switch according to claim 5, wherein said wall portion is disposed in said adapter.

7. The pressure switch according to claim 6, wherein said wall portion is arranged on a straight line with respect to said detector.

* * * * *